Figure 1:
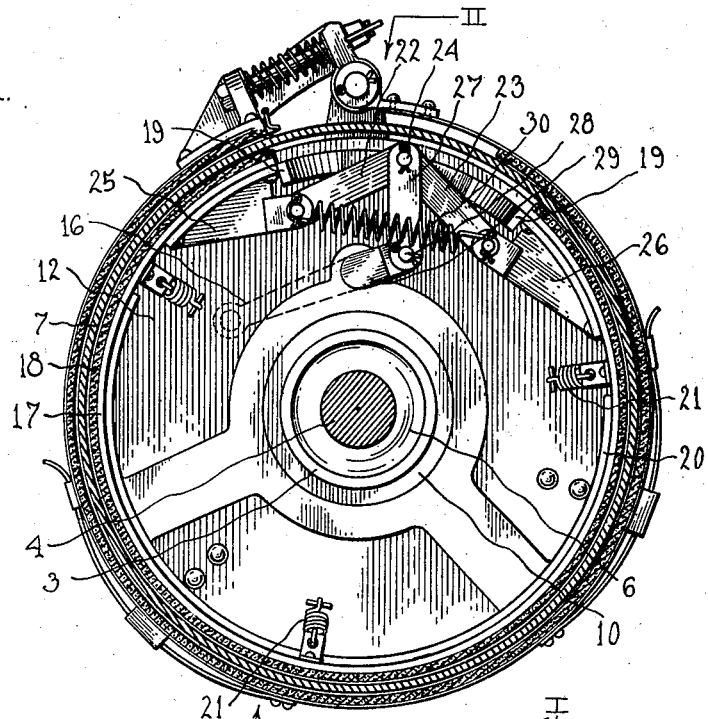

July 15, 1924.

J. W. WHITE ET AL 1,501,885

BRAKE MECHANISM FOR MOTOR VEHICLES

Filed July 31, 1919

Inventors
John W. White
Lisle H. Gaylord
By their Attorney Lloyd Blackmore

Patented July 15, 1924.

1,501,885

UNITED STATES PATENT OFFICE.

JOHN W. WHITE AND LISLE H. GAYLORD, OF DETROIT, MICHIGAN, ASSIGNORS TO GENERAL MOTORS CORPORATION, OF DETROIT, MICHIGAN, A CORPORATION OF DELAWARE.

BRAKE MECHANISM FOR MOTOR VEHICLES.

Application filed July 31, 1919. Serial No. 314,557.

*To all whom it may concern:*

Be it known that we, JOHN W. WHITE and LISLE H. GAYLORD, citizens of the United States, and residents of Detroit, Wayne County, State of Michigan, have invented certain new and useful Improvements in Brake Mechanism for Motor Vehicles, of which the following is a specification.

Our invention relates to brake mechanism designed for use with automobiles, motor trucks and similar self-propelled vehicles, and particularly to brake mechanism in which the braking action is accomplished by means of a brake band which is forced into engagement with a brake drum carried by the wheel of the vehicle, the brake band being prevented from rotating with the wheel when the brake is applied.

The object of our invention is to provide a brake for motor vehicles of the type above referred to and in which a single annular brake band acts upon the interior of the brake drum against which it is forced by a suitable toggle lever arrangement, and which brake band may be referred to as a floating brake band because of the fact that no part thereof is secured to a fixed support and that the band in its entirety is always free to take whatever position may be imposed upon it by the brake drum with which it cooperates.

A further object of our invention is to provide brake mechanism of the class or type above referred to and in which the toggle lever mechanism through which the brake band is forced against the interior of the brake drum is so arranged and acted upon by the brake applying member that the central portion of said brake band will be forced against the interior of the brake drum before the free end portions thereof, thus providing brake mechanism in which a better contact is secured throughout the entire area of the brake band and the surface of the brake drum with which it contacts, and in which the pressure with which the brake band is forced against the brake drum is more nearly uniform throughout its entire extent than has heretofore ordinarily been the case.

A further object of our invention is to provide brake mechanism which will be simple in construction and effective for the purpose for which it is designed; and a still further object is to provide other improvements in and relating to various of the subordinate and auxiliary features of brake mechanism of the general class or type above referred to, all as will hereinafter and at length more fully appear.

Our invention is illustrated in its preferred form in the drawing accompanying and forming a part of this specification, although it will be appreciated that the particular embodiment thereof illustrated may be modified as to various of its features without departing from the spirit of our invention and that our invention includes all such variations and modifications of the particular embodiment thereof illustrated as come within the scope of the concluding claims wherein the particular features in which the invention consist are pointed out.

Figure 2:
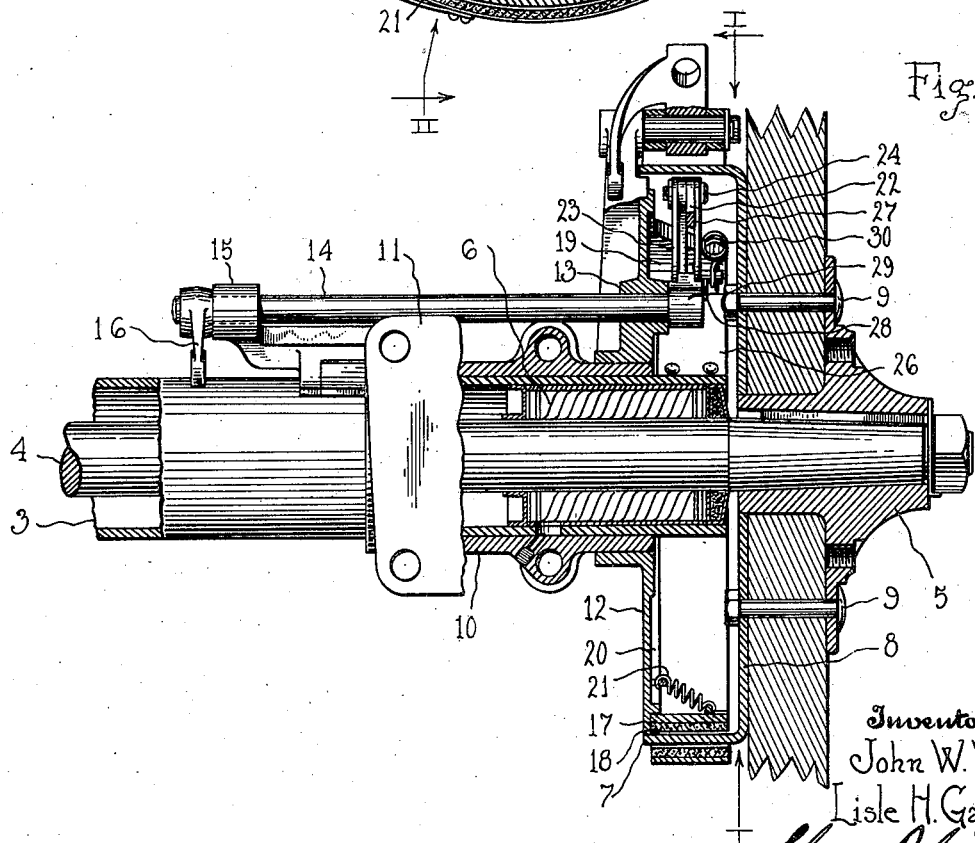

In the drawing:

Figure 1 is a view upon a vertical transverse plane the position of which is indicated by the line I, I of Figure 2; and, Figure 2 is a view showing a section upon a plane indicated by the line II,II of Figure 1.

Referring to the drawing, the reference numeral 3 designates one end of the axle housing or casing of a rear axle of an automobile or similar vehicle, and 4 one of two driving axles extending from centrally located differential gearing to and operatively connected with the hub 5 of a wheel of the vehicle; said axle being supported in suitable bearings such, for example, as roller bearings one of which is indicated by the reference numerals 6 in Figure 2.

Secured to the wheel of which the hub 5 forms a part is a brake drum designated by the reference numeral 7, the same having an inwardly extending flange 8 which is secured in place to the wheel by means of bolts 9 extending therethrough and through a flange of the hub 5, as is usual in motor vehicle construction.

Surrounding and secured in place upon the outer end of the axle housing 3 is a barrel 10 which supports a spring pad 11, which spring pad occupies a horizontal position when the brake mechanism herein illustrated is in use and serves as a support for one of the springs whereby the body of the vehicle is supported.

Secured to the barrel 10 above referred to is a supporting member in the form of a radially extending flange 12, said member being held against rotation and in a fixed position relative to the brake drum as will be appreciated. This supporting member is provided with a bearing 13 within which one end of an oscillating brake applying shaft 14 is supported, the other end of said shaft being supported in an arm or bracket 15 extending from the barrel 10 and to which end an arm 16, through which the shaft is operated when the brakes are to be applied, is secured.

The brake drum 7 is obviously annular in form and the same is disposed substantially at right angles to the plane of the supporting member 12, as clearly shown in Figure 2, and the reference numeral 17 designates a brake band located within the said brake drum; said band being ordinarily provided with a suitable brake lining as indicated by the reference numeral 18. This brake band is referred to as a floating brake band because of the fact that no portion thereof is secured in any way in a fixed position relative to the brake drum with which it cooperates, and because of the fact that the same is always free to contact throughout its entire extent with the interior of the brake drum when the brake is applied.

The reference numerals 19, 19 designate an abutment carried by the supporting flange 12. This element is referred to as a single element because the two ends thereof act together and as a single element to prevent rotary movement of the brake band when the same is forced into engagement with the interior of the brake drum, which function follows because of the fact that the ends of the said brake band are in contact with the said abutment, or rather with the two end portions thereof; the central portion of the abutment being cut away in the embodiment of our invention illustrated in order to provide for movement of the toggle levers hereinafter referred to whereby the brake band is forced against the interior brake drum. This abutment may be formed integrally with the supporting member 12, or the same may be separate from said member and secured thereto in any way, all as may be decided upon by the designer in each particular case.

The supporting flange 12 is provided with a stop shown as in the form of an arcuate ledge 20 extending throughout a considerable portion of the circumference of said supporting member, and against which stop or ledge the brake band 17 is held when the brake is not in use by means of a plurality of springs 21; the ends of said springs being in engagement with eyes carried by the supporting member and with brackets or lugs carried by the brake band, as best shown in Figure 1 of the drawing.

The brake band 17 is forced against the inner surface of the brake drum 7 by brake applying mechanism shown as comprising toggle levers 22, 23, the inner ends of which are pivotally connected with one another as at 24, and the outer ends of which are operatively connected with the two ends of the brake band 17; the connections between the outer ends of said toggle levers and the brake band being illustrated as made through brackets 25, 26 secured one to each of the ends of said band and with which brackets the said levers are pivotally connected. These toggle levers occupy positions at an angle to one another, as shown in Figure 1, and force is communicated to the pivotal connection 24 between said levers to thereby straighten the toggle and force the brake band against the brake drum through and by means of a link 27 pivotally connected with the toggle levers at the point 24. The inner end of this link 27 is pivotally connected at 28 with an arm 29 secured to the inner end of the oscillating brake applying shaft 14, from which it follows that when said shaft is oscillated the link 27 will be pulled downward, referring to Figure 1, thus straightening the toggle and forcing the brake bands against the interior of the brake drum.

It will be obvious that the pivotal point of connection 24 between the toggle levers 22 and 23 is at a greater radial distance from the axis of the brake drum and of the driving axle than the pivotal connections between the outer ends of said toggle levers and the brackets 25, 26; from which it follows that force applied at the pivotal point 24 through the link 27 will tend to move the entire brake band downward, thus securing initial contact between the brake band and the interior of the brake drum at a point remote from the free ends of the said brake band; after which the contact between the band and drum is progressive from such central point of contact toward both the ends of the brake band.

When the brake is to be released the link 27 is obviously moved in a reverse direction, whereupon the pivotal point 24 is forced outward and the toggle levers made to assume a more angular position relative to one another, during which movement the free ends of the brake band are drawn toward one another by means of a spring 30 the ends of which are connected with the ends of the brake band. At the same time the springs 21 hereinbefore referred to act to move the brake band away from the inner surface of the brake drum and against the stop or ledge 20, in which position the said brake band is held until it is again desired to apply the brake.

In the above description, we have used the terms upper, lower, etc., in referring to the figures of the drawing. When the brake mechanism is installed and in use the toggle levers whereby the brake band is applied to the brake drum will be located in front of the driving axle 4 of the vehicle and in substantially the same horizontal plane as the said axle, in which case the brake applying shaft 14 is obviously in front of or toward the forward end of the vehicle relative to the driving axle and the rear axle housing; and between the said driving axle and the toggle mechanism through which the brake band is forced into contact with the brake drum, so that a pull applied through the brake applying arm 16 will oscillate the said shaft and apply the brake by a pull transmitted to the toggle levers through the link 27 and which pulling action, in straightening the toggle levers, tends to move the entire brake band rearward and to secure initial contact at the middle of the brake band as hereinbefore explained.

The first contact between the brake band and the brake drum is therefore at the rear of the driving axle and at the central portion of the brake band, and further contact between the band and the drum is progressive from the point of first contact toward the free ends thereof which are applied last. This progressive application of the brake band provides brake mechanism in which the brake is less liable to seize and go into action suddenly than has heretofore commonly been the case, and, as above pointed out, provides brake mechanism in which the pressure throughout the entire area of the brake band is more uniform than has heretofore been the case and in which effective braking action is secured throughout the entire extent of a brake band the length of which approaches closely to the inner circumference of the brake drum with which it cooperates.

Having thus described and explained our invention, we claim and desire to secure by Letters Patent:

1. In a brake mechanism of the class described, a supporting member held in fixed position relative to a brake drum; an annular brake drum disposed substantially at right angles to the plane of said supporting member; a brake band located within said brake drum; an abutment carried by said supporting member and located adjacent said brake drum and between the two ends of said brake band, and the central portion of which abutment is cut away; two toggle levers pivotally connected together and the connected ends of which lie within the space provided by cutting away the central portion of said abutment as aforesaid, and the free outer ends of which are pivotally connected one with each of the ends of said brake band; and means for operating said toggle levers to thereby force said brake band against the inner surface of said brake drum.

2. In a brake mechanism of the class described, a supporting member held in a fixed position relative to a brake drum; an annular brake drum disposed substantially at right angles to the plane of said supporting member; a brake band located within said brake drum; an abutment carried by said supporting member and located adjacent said brake drum and between the two ends of said brake band, and the central portion of which abutment is cut away; two toggle levers pivotally connected together and the connected ends of which lie within the space provided by cutting away the central portion of said abutment as aforesaid, and the free outer ends of which are pivotally connected one with each of the ends of said brake band; a stop carried by said supporting member; a spring acting upon said brake band to hold it in engagement with said stop; and means for operating said toggle levers to thereby force said brake band against the inner surface of said brake drum.

3. In brake mechanism of the class described, a supporting member held in a fixed position relative to a brake drum; an annular brake drum disposed substantially at right angles to the plane of said supporting member; a brake band located within said brake drum; an abutment carried by said supporting member and located adjacent said brake drum and between the two ends of said brake band; a spring normally under tension and acting between the free ends of said brake band to hold said ends in contact with said abutment; an arcuate ledge carried by said supporting member; a plurality of coiled springs the ends of which are connected with said brake band and said supporting member and whereby said brake band is held in engagement with said ledge; and means for moving the two ends of said brake band apart to thereby force said brake band against the inner surface of said brake drum.

4. In brake mechanism of the class described, a supporting member held in a fixed position relative to a brake drum; an annular brake drum disposed substantially at right angles to the plane of said supporting member; a brake band located within said brake drum; an abutment carried by said supporting member and located adjacent said brake drum and between the two ends of said brake band and the central portion of which abutment is cut away; a spring the ends of which are operatively connected with the two ends of said brake band and which spring normally acts to hold said ends in contact with said abutment; two toggle levers pivotally connected together and the connected ends of which lie within the space provided by cutting away the central portion of said abutment as aforesaid, and the free outer ends of which are pivotally connected one with each of the ends of said brake band; and means for operating said toggle levers to thereby force said brake band against the inner surface of said brake drum.

5. In brake mechanism of the class described, a supporting member held in a fixed position relative to a brake drum; an annular brake drum disposed substantially at right angles to the plane of said supporting member; a brake band located within said brake drum; an abutment carried by said supporting member and located adjacent said brake drum and between the two ends of said brake band, and the central portion of which abutment is cut away; two toggle levers pivotally connected together and the connected ends of which lie within the space provided by cutting away the central portion of said abutment as aforesaid, and the free outer ends of which are pivotally connected one with each of the ends of said brake band; an oscillating shaft supported in a bearing provided in said supporting member and located between the axis of rotation of said brake drum and said toggle levers; an arm carried by said shaft; and a link the two ends of which are connected with the free end of said arm and with the connected inner ends of said toggle levers and whereby said toggle levers may be straightened to thereby force said brake band against the inner surface of said brake drum.

6. In a brake mechanism of the class described, a supporting member held in a fixed position relative to a brake drum; an annular brake drum disposed substantially at right angles to the plane of said supporting member; a brake band located within said brake drum; an abutment carried by said supporting member and located adjacent said brake drum and between the two ends of said brake band; two toggle levers pivotally connected together and the free outer ends of which are pivotally connected one with each of the ends of said brake band; an arcurate ledge carried by said supporting member; a plurality of coiled springs the ends of which are connected with said brake band and with said supporting member and whereby said brake band is held in engagement with said ledge; and a coiled spring normally under tension and the free ends of which are connected with the free ends of said brake band and tend to move the brake band out of contact with the interior of the brake drum.

In testimony whereof we affix our signatures.

JOHN W. WHITE.
LISLE H. GAYLORD.